(12) United States Patent
Lin et al.

(10) Patent No.: US 7,753,075 B2
(45) Date of Patent: Jul. 13, 2010

(54) UPWARDLY AND DOWNWARDLY DISCHARGED FAUCET

(76) Inventors: Bigui Lin, Zhejiang Fulang Sanitary Products Co., Ltd., Damaiyu Industrial & Science & Technology Park, Taizhou City, Zhejiang Province (CN) 317604; Xilong Wang, Zhejiang Fulang Sanitary Products Co., Ltd., Damaiyu Industrial & Science & Technology Park, Taizhou City, Zhejiang Province (CN) 317604

( * ) Notice: Subject to any disclaimer, the term of this patent is extended or adjusted under 35 U.S.C. 154(b) by 595 days.

(21) Appl. No.: 11/793,404

(22) PCT Filed: Jun. 23, 2005

(86) PCT No.: PCT/CN2005/000900
§ 371 (c)(1),
(2), (4) Date: Jun. 18, 2007

(87) PCT Pub. No.: WO2006/066472
PCT Pub. Date: Jun. 29, 2006

(65) Prior Publication Data
US 2008/0142101 A1    Jun. 19, 2008

(30) Foreign Application Priority Data
Dec. 20, 2004    (CN) ........................ 2004 1 0098854

(51) Int. Cl.
*F16K 11/06* (2006.01)
*E03C 1/02* (2006.01)
(52) U.S. Cl. .................... 137/625.46; 137/801; 239/25
(58) Field of Classification Search ............ 137/625.46, 137/801; 4/678; 239/25
See application file for complete search history.

(56) References Cited

U.S. PATENT DOCUMENTS

| 3,079,088 | A | * | 2/1963 | Hermann et al. | .............. 239/25 |
| 3,237,863 | A | * | 3/1966 | Wollmershauser | ........... 239/25 |
| 3,335,957 | A | * | 8/1967 | Jacobson | ...................... 239/25 |
| 5,701,934 | A | * | 12/1997 | Kuran et al. | ........... 137/625.46 |

* cited by examiner

*Primary Examiner*—John Fox

(57) ABSTRACT

The Invention relates to an upwardly and downwardly discharged faucet for comfortable use, comprising a main handle and a main valve body. The main valve body is provided with a diverting valve with dual ports. The diverting valve comprises a valve seat mounted on the main valve body. On the bottom side wall of the valve seat are disposed a left inlet and right inlet which are in communication with a main conduit, respectively. Within a chamber is disposed a diverting valve core, in which an upper water conduit and a lower water conduit are disposed. The upper water conduit is in adjustable communication with the right inlet; and the lower water conduit is in adjustable communication with the left inlet. The outlet of the lower water conduit is in communication with the bottom of the chamber. On the upper end of the diverting valve core is provided a rotary valve stem. The rotary valve stem is equipped with a manual wheel on its outside wall; the manual wheel has a water-storage cavity inside The water-storage cavity is provided at its top with an upper water drainage head having at least one spurt hole. In the rotary valve stem is disposed a water conduit. The inlet of the water conduit is in communication with the upper water conduit, and the outlet is in communication with the lower outlet of the main water aqueduct.

8 Claims, 4 Drawing Sheets

UPWARDLY AND DOWNWARDLY DISCHARGED FAUCET

FIELD OF INVENTION

The invention relates to a kind of water discharging faucet, particularly relates to a kind of downward upward reversing faucet, through which a user is able to selectively choose between an upward discharging mode and a downward discharging mode for spraying water in applications. Such invention is categorized into a technical field of "manifold valve" in International Patent Classification system, with a classification code of F16K11/00.

BACKGROUND OF INVENTION

A water-discharging faucet generally has only one downward outlet. However, such design would cause countless inconveniences in practices. For example, a user has to awkwardly twist his head and extend his mouth under the outlet to drink water. Or otherwise, the user has to use his hands to collect water and repetitiously apply on his face for cleaning purposes. Since the water could not directly sprayed onto the user's face, an optimal cleaning effect would not be achieved. In short, there are a lot of drawbacks of such traditional downwardly discharged faucets. It is foreseeable that a kind of improved water faucets could be welcomed in many applications.

DISCLOSURE OF INVENTION

A primary object of the present invention is to provide a kind of downward upward reversing faucet, through a user is able to selectively and easily choose between an upward discharging mode and a downward discharging mode in practices.

Accordingly, to achieve the above mentioned object, the present invention provides a downward upward reversing faucet, comprising:

a faucet housing defining a water flowing passageway, a primary handle rotatably mounted onto the faucet housing for managing a water flow entering into the water flowing passageway, and a diverting valve mounted onto the faucet housing, wherein the diverting valve comprises a valve body mounted within the inner cavity; a pair of water inlet, namely a first water inlet and a second water inlet, respectively provided at a lower portion of the valve body in communication with the water flowing passageway; a valve chamber; a diverting valve core received within the valve chamber; a pair of water pipes, namely an upper water pipe and a lower water pipe, respectively communicating with the first water inlet and the second water inlet; a valve handling unit mounted onto the faucet housing for operating the diverting valve, wherein the valve handler unit comprises a hollow handler stem slidably engaged with an inner wall of the valve body for guiding water flowing through, a tip pusher provided at a lower end of the handler stem for connecting with the diverting valve, a handler knob sleeved onto the handler stem, wherein the handler knob comprises a water storage chamber, a water discharging panel, having a plurality of openings, capped onto the water storage chamber for water spray, wherein the handler stem has a water guiding-in port communicated with the upper water pipe and a water guiding-out port communicated with the water storage chamber; the faucet housing further comprises a bottom port which is communicated with an lower water port of the water flowing passageway for default water discharging.

According to the present invention, It is noted that the diverting valve core mentioned above further comprises a static valve core and a dynamic valve core rotatably received within the valve chamber, wherein the dynamic valve core has a top side engaged with the lower end of the handler stem, a sealing member is disposed between the dynamic valve core and the handler stem for ensuring a water-tight effect. The dynamic valve core further comprises an engaging groove provided at the top side for engaging with the tip pusher of the handler stem. Instead, the static valve core is secured within the valve chamber with a static manner. In present invention, both of the dynamic and static valve core are made of porcelain materials.

According to the present invention, the valve body is cylindrical shaped body having a threaded outer wall. Such design is to ensure the valve body rotatably screwed into the inner cavity of the faucet housing. Furthermore, the outer wall of the valve body comprises a flange (disk head) provided at a position adjacent to the threaded portion of the outer wall. The flange has a hexagon-shaped side wall and a top side biasing against the handler knob, wherein a lubricating gasket is disposed between two biasing surfaces of the handler knob and the flange disk.

Furthermore, the downward upward reversing faucet further comprises a spline for connecting the handler knob and the handler stem, and a nut rotatably looped onto an upper portion of the handler stem for capping the handler knob.

What is more, the water discharging panel is screwed onto the handler knob, wherein a bottom end of the water discharging panel is provided with a filter disk biased against a resilient member.

A rounding locking nut is rotatably mounted onto a top portion of the handler knob, wherein the upper end of the round locking nut is adapted to prop against the water discharging panel. The outer surface of the water discharging panel is knurled.

The handler knob further includes a turning lever extended from the handler knob for facilitating the handler knob being rotated within a predetermined angular range. Notably, the faucet housing has two marks, respectively indicating an upward spraying mode and a default downward spray mode, on the faucet housing body. The two marks are provided at a pair of positions correspondingly mated with two extreme ends of the angular range of the turning lever.

There is a rubber sealing ring provided to the bottom port.

Compared with the prior art, the downward upward reversing faucet of the present invention is practiced with an effective manner. In use, a user first unfolds the primary handle, thus enabling the water flow approach to the first and second water inlets of the diverting valve through the water flowing passageway, afterwards, the user merely turns the handler knob so as to rotate the handler stem rotate as well. As a result, the tip pusher would rotate thus shift the diverting valve core between an upward spraying position and a downward spraying position. In the upward spraying position, the water guiding in port is communicated with the first water inlet thus enabling the water flow enter the handler stem and poured into the valve chamber to sprayed out via the water discharging panel; in the downward spraying position, the bottom port is communicated with lower water pipe thus allowing the water flow spray out from the bottom side of the faucet housing.

DETAILED DESCRIPTION OF THE PREFERRED EMBODIMENT

Figure 1:
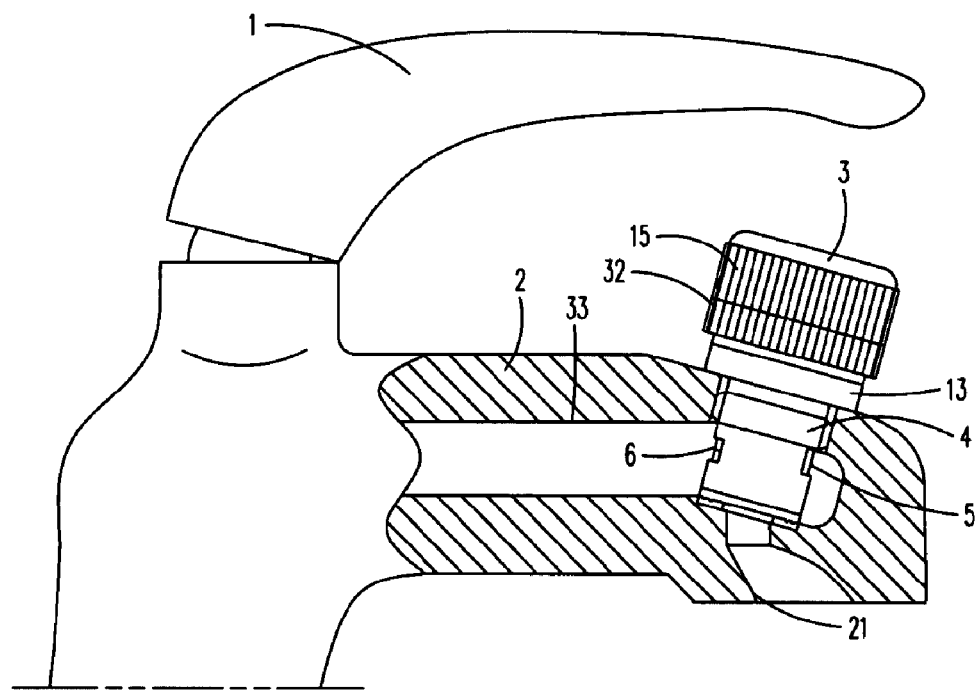
FIG. 1 is a front sectional view of downward upward reversing faucet according to a preferred embodiment of the present invention.

As shown in FIG. 1, a downward upward reversing faucet according to the preferred embodiment of the present invention is illustrated. The downward upward reversing faucet comprises a faucet housing 2 defining a water flowing passageway 33, a primary handle 1 rotatably mounted onto the faucet housing 1 for controlling a water flow entering into the water flowing passageway 33, and a diverting valve 3 mounted onto the faucet housing 2.

Referring to FIG. 2, FIG. 3, FIG. 4, FIG. 5 and FIG. 6, the diverting valve 3 comprises a valve body 4 mounted within flowing passageway 33, wherein the valve body is a cylindrical shaped body having a threaded outer wall. Such design is to ensure the valve body rotatably screwed into the faucet housing 2. Furthermore, the valve body 4 comprises a pair of water inlet, namely a first water inlet 5 and a second water inlet 6, respectively provided at a lower portion of the valve body 4 in communication with the water flowing passageway 33, a valve chamber 7, a diverting valve core 8 received within the valve chamber 7 for dividing the valve chamber 7 into two departments. It is noted that the diverting valve core 8 further comprises a static valve core 19 and a dynamic valve core 18 rotatably received within the valve chamber 7, wherein the dynamic valve core 19 has a top side engaged with a lower end of a handler stem 11. A sealing member 22 is disposed between the dynamic valve core 19 and the handler stem 11 for ensuring a water-tight effect. The static valve core 19 is secured within the valve chamber 7 with a unmoved manner. In present invention, both of the dynamic valve core 19 and static valve core 18 are made of porcelain materials for prolonging the overall lifespan of the faucet.

According to the preferred embodiment of the present invention, the diverting valve core 8 further comprises a pair of water pipes, namely an upper water pipe 9 and a lower water pipe 10, respectively communicating with the first water inlet 5 and the second water inlet 6. The diverting valve is prepared with such a manner that if the upper water pipe 9 was in communication with the first water inlet 5, the communication between the lower water pipe 10 and the second water inlet 5 would be blocked and vice versa. As mentioned above, the downward upward reversing faucet of the present invention further comprises a valve handling unit mounted onto the faucet housing for operating the diverting valve, wherein the valve handler unit comprises a hollow handler stem 11 slidably engaged with an inner wall of the valve body 4 for guiding water flowing through, a tip pusher 12 provided at a lower end of the handler stem 11 for actuating with the diverting valve core 18, a handler knob 13 sleeved onto the handler stem 11 via a spline means, wherein the handler knob 13 comprises a water storage chamber 14, a water discharging panel 15, having 32 openings 17, capped onto the water storage chamber 14 for water spray. It is noted that a diameter of each of the openings 17 is 0.9 mm and such openings 17 are bi-circularly and evenly distributed onto the water discharging panel 14 with respect to a center point of the water discharging panel 15. Preferably, the inner circle of such openings 17 is made of 12 such openings and the outer circle consists of the remaining 20 openings. What is more, the handler stem 11 further has stem channel 16 having a water guiding-in port communicated with the upper water pipe 9 and a water guiding-out port communicated with the water storage chamber 14. The faucet housing 2 further comprises a bottom port 20 provided at a bottom side of the valve chamber 5, such bottom port 20 is communicated with the water flowing passageway 33 for default water discharging. There is a rubber sealing ring 31 provided to the bottom port 20 for sealing gap between a bottom side of the valve body 4 and the faucet housing 2.

Furthermore, the outer wall of the valve body 4 comprises a flange 23 (disk head) provided at a position adjacent to the threaded portion of the valve body 4. The flange 23 has a hexagon-shaped sidewall 24 for tightening up the valve body so as to ensure the valve body 4 tightly received with the faucet housing 2. The flange 23 has a top side biasing against the handler knob 13, wherein a lubricating gasket 25 is disposed between two biasing surfaces of the handler knob 13 and the flange 23.

A rounding locking nut 26 is rotatably mounted onto a top portion of the handler stem 13, wherein the bottom end of the round locking nut 26 is biasing against the handler knob 13 so as to lock the handler knob 13 onto the handler stem 11.

The water discharging panel 15 is screwed onto the top of the handler knob 11, wherein a filster disk 27 is provided at the lower end water discharging panel and supported by a resilient member so as to guarantee filter disk 27 pressing against the lower end of the water discharging panel 15. The lower plane of the filter disk 27 is adapted to be cooperative with the water guiding out port of the stem channel 16 so as to adjust the spraying size of the stem channel 16. Preferably, the quantity of the openings 17 is ranged between 12-60, and the diameter of each openings 17 might be varied between 0.5-1.5 mm.

A rounding locking nut 32 is rotatably mounted onto a top portion of the handler knob 13, wherein the upper end of the round locking nut 32 is adapted to prop against the water discharging panel 15. The outer surface of the water discharging panel 15 is knurled. Once the water outflow volume is set, the round locking nut 32 would utilized to press against the water discharging panel 15 for obviating any undesirable deformation in applications.

Figure 2:
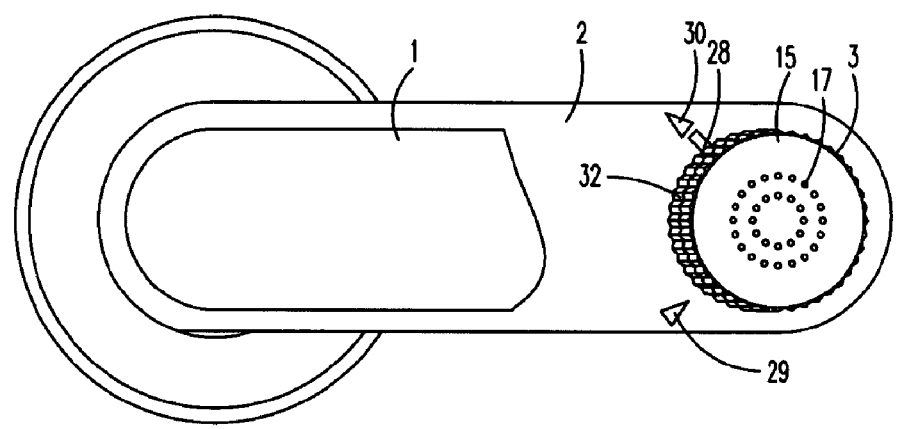
FIG. 2 is a top view of the downward upward reversing faucet according to the above-preferred embodiment of the present invention.
Figure 3:
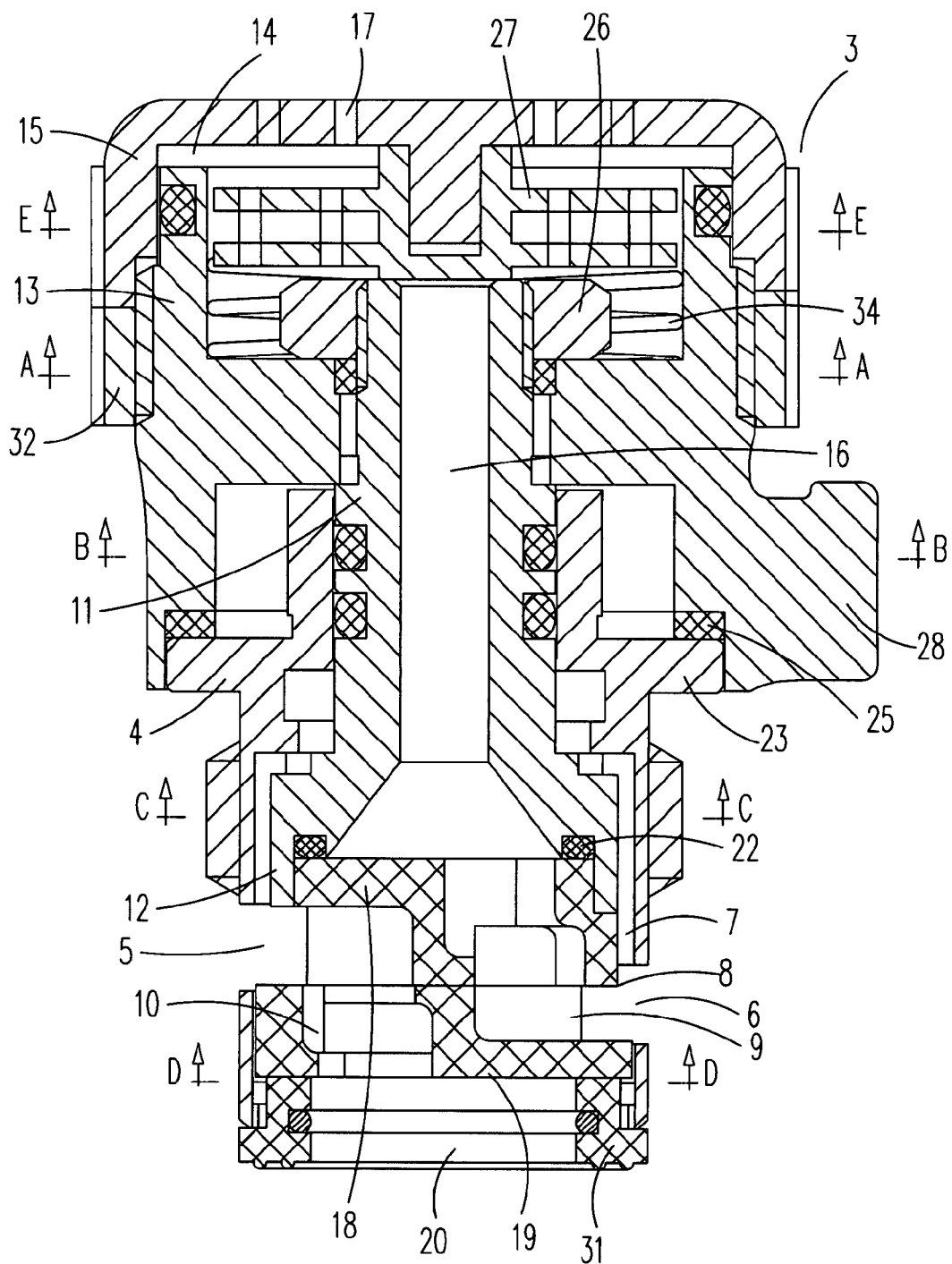
FIG. 3 is a sectional front view illustrating a diverting valve with dual ports according to the present invention.
Figure 4:
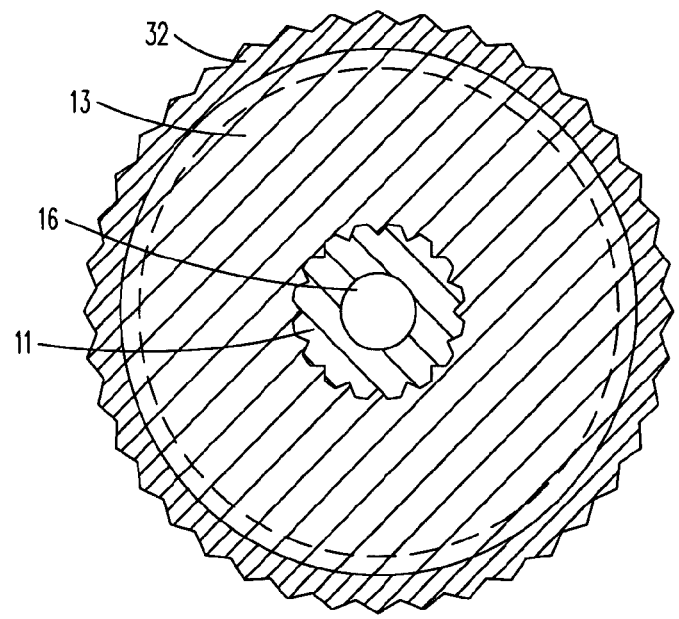
FIG. 4 is an A-A sectional view of FIG. 3.
Figure 5:
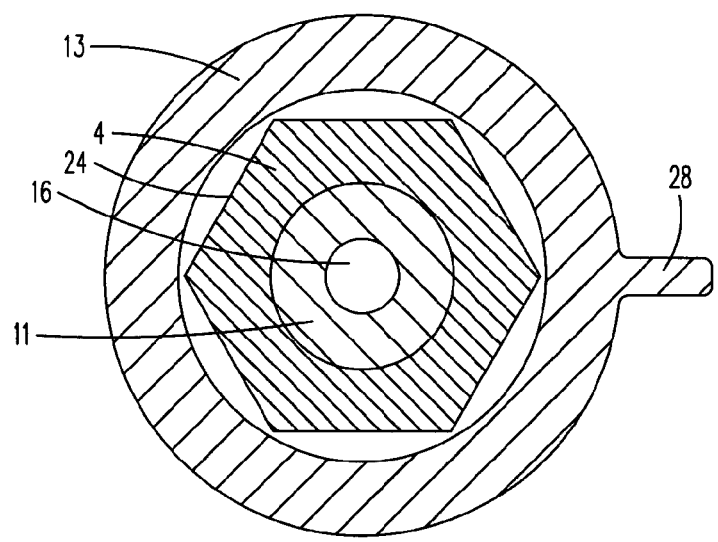
FIG. 5 is a B-B sectional view of FIG. 3.
Figure 6:
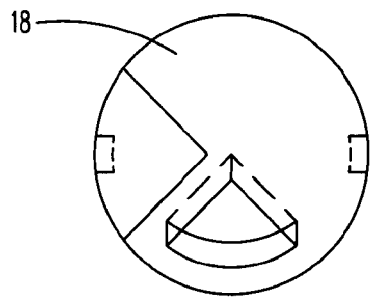
FIG. 6 is a C-C sectional view of FIG. 3.
Figure 7:
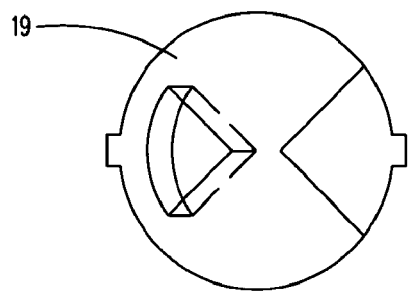
FIG. 7 is a D-D sectional view of FIG. 3.
Figure 8:
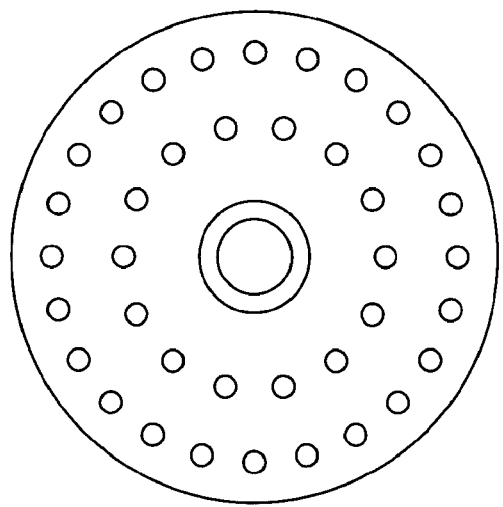
FIG. 8 is a E-E sectional view of FIG. 3.

As shown in FIG. 2 and FIG. 3, the handler knob 13 further includes a turning lever 28 extended from the handler knob 13 for facilitating the handler knob being rotated within a predetermined angular range. Notably, the faucet housing 2 has two marks, namely an upward spraying mark 29 and a downward spraying mark 30, respectively indicating an upward spraying mode and a default downward spray mode, provided on the faucet housing body. The two marks are provided at a pair of positions correspondingly mated with two extreme ends of the angular range of the turning lever 28.

Compared with the prior art, the downward upward reversing faucet of the present invention is practiced with an effective manner. In use, a user first unfolds the primary handle 1, thus enabling the water flow approach to the first and second water inlets 5, 6 of the diverting valve 3 through the water flowing passageway 33, afterwards, the user merely turns the handler knob 13 and turn the turning lever 28 to match the upward or downward spraying mark 29, 30. As a result, the handler stem 13 would be rotated as well, which in turn force the tip pusher 12 shift the diverting valve core 18 between an upward spraying position and a downward spraying position. In the upward spraying position, the upper water pipe is communicated with the first water inlet thus enabling the water flow enter the stem channel 16 and then poured into the valve chamber to be sprayed out via the water discharging panel 15; in the downward spraying position, the bottom port is communicated with lower water pipe 10 thus allowing the water flow spray out from the bottom side of the faucet housing 2. In the upward spraying position, the water flow is capable of directly spraying onto a user's face thus achieving a water-saving effect.

Although the aforesaid examples have been described in respect with the preferred embodiments of the present invention, it is not intended to limit the design and scope of the invention. It would be apparent to those skilled in the art that various other changes and modifications can be made without departing from the spirit and scope of the invention. Therefore it is intended to panel in the appended claims all such changes and modifications that are within the scope of this invention.

What is claimed is:

1. A downward upward reversing faucet, comprising:
   a faucet housing defining a water flowing passageway;
   a primary handle rotatably mounted onto said faucet housing for managing a water flow entering into said water flowing passageway; and
   a diverting valve mounted onto said faucet housing for diverting said water flow, comprising:
   a valve body provided with said water flowing passageway;
   a pair of water inlets, namely a first water inlet and a second water inlet, respectively provided at a lower portion of said valve body in communication with said water flowing passageway;
   a valve chamber;
   a diverting valve core received within said valve chamber;
   a pair of water pipes, namely an upper water pipe manageably communicated with said first water inlet and a lower water pipe communicating with a bottom port of said valve chamber;
   a valve handling unit mounted onto said faucet housing for operating said diverting valve, wherein said valve handler unit comprises a hollow handler stem slidably engaged with an inner wall of said valve body, a tip pusher provided at a lower end of said handler stem for connecting with said valve core, a handler knob mounted onto said handler stem, wherein the handler knob comprises a water storage chamber, a water discharging panel, having at least a discharge opening, capped onto said water storage chamber for water spray, wherein the handler stem has a water guiding-in port communicated with said upper water pipe and a water guiding-out port communicated with said water storage chamber; and
   a primary water draining port provided at a lower end of said water flowing passageway and communicated with said bottom port for downward water discharging.

2. The downward upward reversing faucet, as recited in claim 1, wherein said diverting valve core further comprises a static valve core and a dynamic valve core rotatably received within said valve chamber and engaged with said lower end of said handler stem, and a sealing member disposed between said dynamic valve core and said handler stem for ensuring a water-tight effect, wherein said dynamic valve core further has an engaging groove defined thereon for coordinating with said tip pusher, said static valve core is secured with said valve chamber and both of said static valve core and said dynamic valve core are made of porcelain materials.

3. The downward upward reversing faucet, as recited in claim 2, wherein said diverting valve is cylindrical shaped body having a threaded outer wall, such that said diverting valve is capable of being rotatably screwed into said faucet housing, wherein said outer wall of said diverting valve comprises a flange (disk head) provided at a position adjacent to a threaded portion of said outer wall, said flange has a hexagon-shaped side wall and a top side biasing against said handler knob, wherein a lubricating gasket is disposed between two biasing surfaces of said handler knob and said flange disk.

4. The downward upward reversing faucet, as recited in claim 3, further comprising a spline for connecting said handler knob and said handler stem, and a nut rotatably looped onto an upper portion of said handler stem for capping said handler knob.

5. The downward upward reversing faucet, as recited in claim 4, wherein said water discharging panel is screwed onto said handler knob, wherein a bottom end of said water discharging panel is provided with a filter disk supported by a resilient member.

6. The downward upward reversing faucet, as recited in claim 5, wherein said handler knob further comprises a rounding locking nut rotatably mounted onto a top portion of said handler knob, wherein an upper end of said round locking nut is adapted to prop against said water discharging panel, which further comprises a knurled outer surface.

7. The downward upward reversing faucet, as recited in anyone of claims 1-6, wherein said handler knob further includes a turning lever extended from said handler knob for facilitating said handler knob being rotated within a predetermined angular range, wherein said faucet housing has two marks, respectively indicating an upward spraying mode and a default downward spray mode, provided at a pair of positions correspondingly mated with two extreme ends of said angular range of said turning lever.

8. The downward upward reversing faucet, as recited in claim 7, further comprising a sealing gasket provided at said primary water draining port.

* * * * *